(12) United States Patent
Lefort et al.

(10) Patent No.: US 8,397,928 B2
(45) Date of Patent: Mar. 19, 2013

(54) WOOD BARREL, PRODUCTION METHOD THEREOF AND MACHINE FOR IMPLEMENTING SAME

(75) Inventors: Vincent Lefort, Boutiers Saint Trojan (FR); Christelle Ganne-Chedeville, Biel/Bienne (CH)

(73) Assignee: Tonnellerie Taransaud, Merpins (FR)

( * ) Notice: Subject to any disclaimer, the term of this patent is extended or adjusted under 35 U.S.C. 154(b) by 276 days.

(21) Appl. No.: 12/679,629

(22) PCT Filed: Sep. 25, 2008

(86) PCT No.: PCT/FR2008/051706
§ 371 (c)(1),
(2), (4) Date: Mar. 23, 2010

(87) PCT Pub. No.: WO2009/050370
PCT Pub. Date: Apr. 23, 2009

(65) Prior Publication Data
US 2010/0193473 A1    Aug. 5, 2010

(30) Foreign Application Priority Data
Sep. 26, 2007  (FR) .................................. 07 57867

(51) Int. Cl.
*B23K 20/12*    (2006.01)
*B65D 8/10*    (2006.01)

(52) U.S. Cl. ........... 217/81; 217/72; 228/2.1; 228/112.1

(58) Field of Classification Search ................... 217/91, 217/81, 72; 228/2.1, 112.1
See application file for complete search history.

(56) References Cited

U.S. PATENT DOCUMENTS
2,027,403 A * 1/1936 Shepherd ..................... 217/72

FOREIGN PATENT DOCUMENTS
DE    196 20 273 A1    11/1997
EP    1 170 101 A1    1/2002

OTHER PUBLICATIONS
"Timber welding—not such a tall tale", The Welding Institute, Article Internet, Feb. 2006, XP002476598, Retrieve from Internet: URL: http://www.twiprofessional.com/professional/unprotected/band_1/c1402a.html> [retrieved on Apr. 15, 2008].

* cited by examiner

Primary Examiner — Stephen Castellano
(74) Attorney, Agent, or Firm — Sughrue Mion, PLLC

(57) ABSTRACT

A barrel made of wood, in particular oak wood, for containing a liquid, such as wine, the barrel comprising a hollow body closed by two barrel heads, each barrel head comprising an assembly of substantially rectangular wooden battens assembled parallel to one another via facing lateral faces, the barrel being characterized in that the adjacent lateral faces (101, 201) of two assembled-together battens (100, 200) are in intimate leaktight contact, with fibers of the wood of each of said battens being tangled together and held in a matrix of fused intercellular materials.

13 Claims, 2 Drawing Sheets

WOOD BARREL, PRODUCTION METHOD THEREOF AND MACHINE FOR IMPLEMENTING SAME

Figure 1:
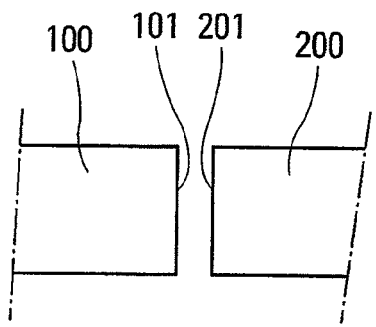

The present invention relates to a barrel made of wood, in particular for containing wine or spirits, to a method of fabricating a head for such a barrel, and to a device for implementing such a method.

The wine-making industry conventionally uses barrels that are made of wood, and more particularly of oak wood, which is an expensive wood, for the purpose of producing and/or storing wine. Such barrels perform an important function in maturing wines and spirits, because of the particular physicochemical properties of wood that contribute to the taste of the finished product.

A barrel typically comprises a body of bulging cylindrical shape that is closed at both ends by respective barrel heads, likewise made of oak wood. Such a head needs to satisfy essentially two criteria: leaktightness; and the ability to withstand a pressure of several bars against its inside face.

The traditional cooper's method of fabricating barrel heads consists in machining oak battens that, after machining, are sorted as a function of their widths and their lengths, and are placed side by side so that a disk-shaped head can be cut therefrom. Each oak batten is then pierced by holes in its lateral assembly faces, referred to as joints, and dowels are placed in each of the holes of one of the lateral faces. Reed material is then placed flat against each joint to provide sealing between two assembled-together head battens. Thus, the oak battens are assembled together via their lateral faces, with each dowel being engaged in two facing holes of two battens so as to hold the reed material captive between them, and the assembled-together parts are subsequently shaped to form the barrel head.

Such barrels need to be replaced regularly, generally after 4 to 6 years of use, in particular because their inside and outside surfaces become spoilt, in particular in contact with wine. The presence of reed material that might rot thus gives rise to the risk of spoiling the wine (or the spirits) contained in the barrel in terms both of taste and of microbe content. Furthermore, the above-described fabrication method is itself relatively expensive since it consumes time and labor.

In order to avoid the unattractive appearance of the rot that develops over time on the reed material, the associated hygiene problems, and the risks of spoiling the liquid, proposals have been made to replace reed material with silicone, which is also effective from a leaktightness point of view. Nevertheless, silicone raises the problem when machining the head, since it then behaves like an elastic. It can also have an effect on the liquid after a certain length of time.

Document EP 1 170 101 proposes another method of fabricating barrel heads, consisting in tongue-and-groove type assembly, like flooring. That method, which is relatively complicated, makes it possible to omit any reed material, but nevertheless gives rise to problems of leaktightness and it does not eliminate hygiene risks associated with spoiling the wine. This is because pockets of wine or nests for microorganisms can arise in the assembly, with the accompanying risk of harmful exchanges with the liquid.

It should also be observed that it is not desirable to use a glue or any other composition that is not suitable for coming into contact with foodstuffs in a method of fabricating a barrel head. Furthermore, good leaktightness and good ability to withstand pressure are necessary.

An object of the present invention is to provide a barrel made of wood that does not reproduce the above-mentioned drawbacks, and in particular that has a head that is less expensive to produce, while guaranteeing sufficient strength and good leaktightness.

Another object of the present invention is to increase strength and/or leaktightness compared with a head obtained by the above-described existing methods.

An object of the present invention is also to provide a barrel that improves exchanges between the container (the barrel) and the liquid content (wine, spirits), by eliminating any risks of harmful interaction that might spoil the quality of the liquid, and thereby benefiting consumer health.

The present invention also has the object of providing a barrel having a head that includes joints that are substantially invisible from the outside.

The present invention thus provides a barrel made of wood, as described in claim 1. Advantageous embodiments of the barrel are described in the claims that depend from claim 1.

The present invention also provides a method of fabricating a head for a barrel made of wood, as described in claim 7. Advantageous implementations of the method are described in the claims that depend on claim 7.

The present invention also provides a machine for implementing the above-described fabrication method, as described in claim 13. Advantageous embodiments of the machine are described in the claims that depend on said claim 13.

Figure 3:
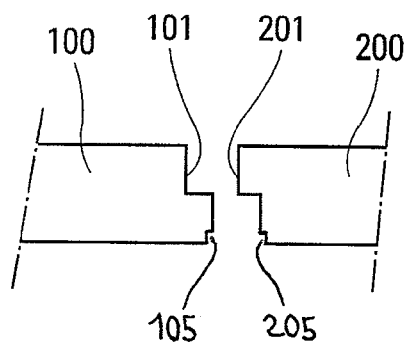
Figure 4:
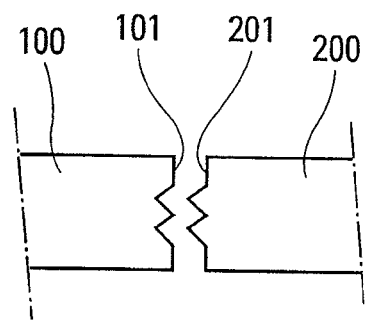
Figure 5:
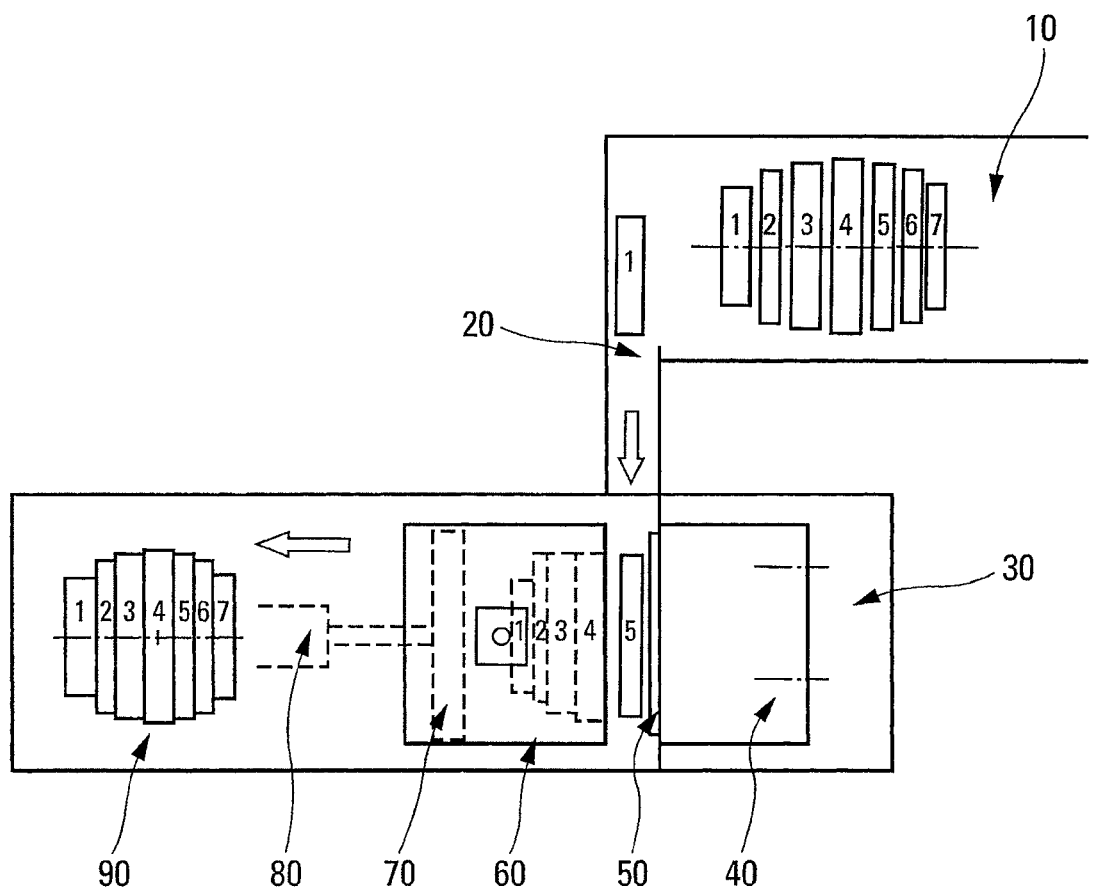

The characteristics and advantages of the invention appear more clearly from the following detailed description of the invention made with reference to the accompanying drawings, given as non-limiting examples, and in which:

FIGS. 1 to 4 are diagrammatic section views of various batten profiles adapted to the assembly method of the invention; and FIG. 5 is a diagrammatic view of a machine suitable for use in implementing the method of the invention.

A barrel of the invention generally comprises a body (not shown) substantially in the form of a bulging cylinder having a central portion of diameter greater than the diameter of its ends, which ends are closed by respective barrel heads made of wood and cut to a disk shape. The barrel head of the invention comprises a set of battens made of wood, in particular oak wood, which battens are assembled parallel to one another by the method that is described below. Typically a barrel has a capacity of about 225 liters, however the invention applies to barrels or casks of other volumes.

The fabrication method of the invention includes a step in which a batch of head battens is selected in such a manner that the lengths and the widths presented by said battens of the batch, when taken together, are sufficient to enable a barrel head to be cut therefrom subsequently, after the battens have been assembled together. The batch has a plurality of battens, possibly of different lengths and/or widths, that are disposed parallel to one another, with the longest battens preferably being located in the middle of the batch. By way of example, a batten may have a thickness of about 25 millimeters (mm), a width of about 4 centimeters (cm) to 13 cm, and a length of the order of 45 cm to 85 cm. The longitudinal direction of the parts making up the head is generally parallel to the fibers of the wood. The lateral assembly faces of the battens of the batch present a profile that has previously been machined thereon, and that is described below. The working faces of the battens are generally regular and substantially plane. Typically, a head comprises six to 14 battens depending on their width and depending on the diameter of the head, which diameter generally lies in the range about 50 cm to 90 cm. Naturally, other dimensions could also be envisaged.

According to the invention, the battens forming the head are assembled together by linear friction welding. This is an assembly method that consists in rubbing together two pieces of wood so as to heat their surfaces, thereby causing the wood to be physico-chemically modified, in particular in order to activate certain adhesive substances such as lignin. The welded joint is then made up of tangled-together fibers held in a matrix of fused intercellular materials. This assembly method has the advantage of being simple, quick, and without requiring any composition to be added, while also being leaktight and strong.

There is thus no need for any reed material or the like, nor for dowels or pins, nor for silicone or glue, nor for any other element for fastening and/or sealing the fastening of the battens.

The welded joint that is leaktight is obtained by the combination of a particular orientation for the battens, i.e. in the direction of the grain of the wood, and particular welding parameters as described below.

Advantageously, the welding is performed in such a manner that the tangling together of the wood fibers extends over a depth lying in the range about 0.1 mm to 2 mm in each batten.

FIGS. 1 to 4 show different variant embodiments of the facing lateral faces 101, 201 of two battens 100, 200 for assembling together.

In FIG. 1, the two faces 101, 201 are substantially plane over their entire surfaces. In a variant, they could be plane while also being inclined relative to the vertical.

Figure 2:
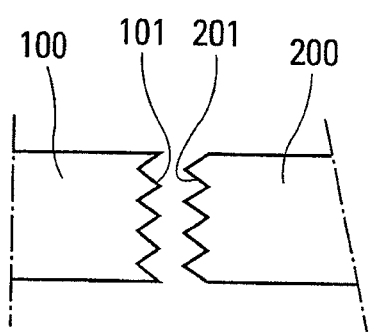

In FIGS. 2 to 4, the lateral faces 101, 201 are profiled, with the profile of the lateral face 101 of a batten 100 being complementary to the profile of the facing lateral face 201 of the other batten 200. These profiles may comprise one or more sawteeth or crenellation(s) (FIGS. 2 and 4), one or more step(s) (FIG. 3), or the like. Various combinations of profile can also be envisaged. Naturally, during welding, these profiles must allow relative movement to take place in the longitudinal direction (perpendicularly to the plane of FIGS. 1 to 4), and they must ensure intimate contact between two facing lateral faces so that when one of the battens is set into motion, linear friction welding takes place.

Advantageously, the welding method causes the batten for assembly to vibrate at a frequency lying in the range 50 hertz (Hz) to 150 Hz, preferably about 100 Hz. The amplitude of the vibration of the batten for assembling advantageously lies in the range about 1 mm to about 10 mm, and is preferably about 4 mm. The transverse pressure applied during vibration advantageously lies in the range about 0.2 megapascals (MPa) to 3 MPa, and is preferably about 1 MPa. The duration of the vibration advantageously lies in the range about 1 second (s) to 20 s, and is preferably about 10 s.

Preferably, in addition to the vibration stage, welding includes a holding stage during which there is no longer any vibration, but during which pressure continues to be applied. This enables the welded joint to harden. The characteristics of this holding pressure (magnitude and duration) may advantageously be similar to those applied during the vibration stage, however they could also be different.

FIG. 5 is a diagram of an assembly machine enabling the method of the invention to be performed. Naturally, this is merely one particular embodiment.

The battens, seven in number in this example, are numbered 1 to 7 and they are advantageously previously machine-planed on four faces and profiled on their lateral faces (also referred to as edge faces) for welding. By way of example, the battens are paired by an operator who puts the parts into place and optionally marks a central line used as a working reference. The battens are then positioned on an inlet bench 10, and transferred one by one to the welding machine 30 by a conveyor 20. The battens can then engage one by one in the welding machine, with the assembly lying in a common horizontal plane. The welding machine 30 may comprise a support structure having a horizontal bench serving at one end to receive the battens and at its other end to deliver a welded head to an outlet bench 90. The machine comprises a vibrator system 40 for vibrating the batten that is to be assembled to the subassembly that is initially constituted by the first batten, and subsequently by the set of battens that have already been welded together. The system may take hold of the batten for assembly, e.g. by means of a mechanical clamp 50. The subassembly formed by the welded-together battens advances under a presser cover 60, which by applying pressure avoids breakage of the already welded-together battens while the next batten is being added. The welded-together battens under the cover 60 may be held by a stop abutment 70 that also serves to apply pressure thereto during the welding operation. The stop abutment may be secured to stop-advance means 80 enabling said welded-together battens to be caused to advance as the other battens are added thereto.

After welding, the faces of the head are advantageously planed in order to correct any offsets or projecting fiber flash and to eliminate marks and impurities. Welding the battens together can lead to a loss of material in the joint, typically of the order of 1 mm to 2 mm, which can lead to a so-called "burnt" joint of dark color being visible in the outside face of the barrel head, which is not very pleasing in appearance. In order to solve this problem, small shoulders 105, 205 may be made in the facing lateral faces 101, 201 for welding together adjacent to the outside face of the head, as shown diagrammatically in FIG. 3. Thus, welding does not take place in register with these shoulders 105, 205, however the facing lateral faces come substantially into contact because of the above-mentioned loss of material. For this purpose, the total width of the two shoulders 105 and 205 is advantageously approximately equal to the width of material lost due to welding. Thus, the welded joint is caused to be substantially invisible in the outside face. Naturally, these shoulders 105, 205 could be provided in the embodiments other than that of FIG. 3, and in particular in the embodiments of FIGS. 1, 2, and 4. Finally, the head is machined around its periphery of circular shape so as to form a chamfer, as with a conventional assembly, so as to enable the head to be assembled on the barrel.

The present invention thus serves to provide a method of assembling a barrel, in particular its heads, in a manner that is more effective, more durable over time, safe, and reliable from the points of view both of strength and of leaktightness, and it makes this possible at low cost.

Although the invention is described with reference to a particular method and a particular machine, it should be understood that the person skilled in the art may make any useful modifications thereto without going beyond the ambit of the present invention, as defined by the accompanying claims.

The invention claimed is:

1. A barrel made of wood, in particular oak wood, for containing a liquid, such as wine, the barrel comprising a hollow body closed by two barrel heads, each barrel head comprising an assembly of substantially rectangular wooden battens assembled parallel to one another via facing lateral faces, the barrel being characterized in that the adjacent lateral faces (101, 201) of two assembled-together battens (100, 200) are in intimate leaktight contact, with fibers of the wood of each of said battens being tangled together and held in a matrix of fused intercellular materials, wherein the barrel head has an outside face visible from the outside, and, after welding, a portion of the lateral faces adjacent to the outside face are in contact without fusing to each other.

2. A barrel according to claim 1, wherein the wood fibers are tangled together over a depth lying in the range about 0.1 mm to 2 mm in each of the lateral faces (101, 201).

3. A barrel according to claim 1, wherein the facing lateral faces (101, 201) are plane over their entire areas.

4. A barrel according to claim 1, wherein the facing lateral faces (101, 201) have complementary profiles.

5. A barrel according to claim 4, wherein the profiles comprise sawteeth and/or crenellations and/or steps and/or combinations thereof.

6. A barrel according to claim 1, wherein each of the lateral faces (101, 201), before welding, has a shoulder (105, 205) beside said outside face.

7. A barrel according to claim 1, wherein each of the lateral faces (101, 201) has a portion which, after welding, is not fused together.

8. A method of fabricating a barrel made of wood according to claim 1, the method being characterized in that it comprises the following steps:
  placing at least one batten beside at least one other batten with their facing lateral faces in contact with each other; and
  joining the two battens together by linear friction welding of their facing lateral faces.

9. A method according to claim 8, wherein the depth of the welding in each of the lateral faces (101, 201) lies in the range about 0.1 mm to 2 mm.

10. A method according to claim 8, wherein each lateral face (101, 201) includes a shoulder (105, 205) beside the outside face of the barrel head, the total width of said two shoulders being substantially equal to the width of material lost due to the welding.

11. A method according to claim 6, wherein the welding step comprises rubbing the facing lateral faces (101, 201) against each other while simultaneously applying pressure, thereby heating said faces and giving rise to physico-chemical modification of the wood, in particular by activating adhesive substances such as lignin.

12. A method according to claim 11, wherein the welding step is performed at a vibration frequency lying in the range about 50 Hz to 150 Hz, with a vibration amplitude of the batten for assembly lying in the range about 1 mm to 10 mm, while applying a pressure lying in the range about 0.2 MPa to 3 MPa, for a duration lying in the range about 1 s to 20 s.

13. A method according to claim 11, wherein, after the rubbing stage, the welding step includes a stage of maintaining the head under pressure, thereby enabling the welded joint to harden, said pressure-maintaining stage being performed by applying pressure lying in the range about 0.2 MPa to 3 MPa, for a duration lying in the range about 1 s to 20 s.

* * * * *